United States Patent
Hu et al.

(10) Patent No.: US 10,444,091 B2
(45) Date of Patent: Oct. 15, 2019

(54) ROW COLUMN ARCHITECTURE FOR STRAIN SENSING

(71) Applicant: Apple Inc., Cupertino, CA (US)

(72) Inventors: Jason C. Hu, Saratoga, CA (US); Manu Agarwal, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/484,958

(22) Filed: Apr. 11, 2017

(65) Prior Publication Data

US 2018/0292933 A1    Oct. 11, 2018

(51) Int. Cl.
*G01L 1/20* (2006.01)
*G01L 5/22* (2006.01)
*G06F 3/041* (2006.01)

(52) U.S. Cl.
CPC .............. *G01L 1/205* (2013.01); *G01L 5/22* (2013.01); *G06F 3/0414* (2013.01); *G06F 3/0416* (2013.01)

(58) Field of Classification Search
CPC ...................... G06F 3/045; G06F 3/041; G06F 2203/04105; G01L 1/205; G01L 5/22
See application file for complete search history.

(56) References Cited

U.S. PATENT DOCUMENTS

| | | |
|---|---|---|
| 3,543,568 A | 12/1970 | Russell |
| 3,745,502 A | 7/1973 | Watanabe |
| 3,876,912 A | 4/1975 | Sanders |
| 4,345,477 A | 8/1982 | Johnson |
| 4,423,640 A | 1/1984 | Jetter |
| 4,516,112 A | 5/1985 | Chen |
| 4,634,917 A | 1/1987 | Dvorsky et al. |
| 4,695,963 A | 9/1987 | Sagisawa |
| 4,951,510 A | 8/1990 | Holm-Kennedy et al. |
| 5,481,905 A | 1/1996 | Pratt |
| 5,577,021 A | 11/1996 | Nakatani et al. |

(Continued)

FOREIGN PATENT DOCUMENTS

| | | |
|---|---|---|
| CN | 1527933 A | 9/2004 |
| CN | 1796955 | 7/2006 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — LaTanya Bibbins
(74) *Attorney, Agent, or Firm* — Brownstein Hyatt Farber Schreck, LLP

(57) ABSTRACT

Disclosed herein are structures, devices, and methods for sensing physical parameters, such as strain in a surface, using resistance-based parameter sensors and current sensing. An applied strain can cause a differential change in one or more currents from two resistors configured in parallel in the sensor. Strain can be inferred from a ratio of the difference of the two currents to a sum of the two currents. These structures and methods can be adapted to measure strain or other parameters using an array of sensors, with common voltages applied to rows of the array, and currents being summed in column in the array so that fewer receivers are needed.

22 Claims, 12 Drawing Sheets

(56) References Cited

U.S. PATENT DOCUMENTS

| | | | |
|---|---|---|---|
| 5,616,846 A * | 4/1997 | Kwasnik | G01L 1/2281 340/870.16 |
| 5,673,041 A | 9/1997 | Chatigny et al. | |
| 5,708,460 A | 1/1998 | Young | |
| 5,790,215 A | 8/1998 | Sugahara | |
| 5,844,506 A | 12/1998 | Binstead | |
| 5,915,285 A | 6/1999 | Sommer | |
| 6,288,829 B1 | 9/2001 | Kimura | |
| 6,369,865 B2 | 4/2002 | Hinata | |
| 6,386,023 B1 | 4/2002 | Sajna et al. | |
| 6,606,087 B1 | 8/2003 | Tomomatsu | |
| 6,637,276 B2 * | 10/2003 | Adderton | G01L 5/161 73/862.41 |
| 6,778,167 B2 | 8/2004 | Ohashi | |
| 6,812,161 B2 | 11/2004 | Heremans | |
| 6,973,837 B2 | 12/2005 | Barnett | |
| 7,154,481 B2 | 12/2006 | Cross et al. | |
| 7,176,897 B2 | 2/2007 | Roberts | |
| 7,190,350 B2 | 3/2007 | Roberts | |
| 7,196,694 B2 | 3/2007 | Roberts | |
| 7,211,885 B2 | 5/2007 | Nordal et al. | |
| 7,320,253 B2 * | 1/2008 | Hanazawa | G01P 15/123 73/1.37 |
| 7,331,245 B2 | 2/2008 | Nishimura | |
| 7,392,716 B2 | 7/2008 | Wilner | |
| 7,441,467 B2 | 10/2008 | Bloom | |
| 7,456,823 B2 | 11/2008 | Poupyrev et al. | |
| 7,511,702 B2 | 3/2009 | Hotelling | |
| 7,538,760 B2 | 5/2009 | Hotelling et al. | |
| 7,707,894 B2 | 5/2010 | Sumigawa | |
| 7,724,248 B2 | 5/2010 | Saito | |
| 7,726,199 B2 | 6/2010 | Shkel et al. | |
| 7,755,616 B2 | 7/2010 | Jung et al. | |
| 7,800,592 B2 | 9/2010 | Kerr et al. | |
| 7,812,268 B2 | 10/2010 | Ely | |
| 7,821,502 B2 | 10/2010 | Hristov | |
| 7,903,091 B2 | 3/2011 | Lee | |
| 7,992,448 B2 | 8/2011 | Shimazu | |
| 8,020,456 B2 | 9/2011 | Liu et al. | |
| 8,050,876 B2 | 11/2011 | Feen et al. | |
| 8,056,421 B2 | 11/2011 | Sumigawa | |
| 8,077,154 B2 | 12/2011 | Emig et al. | |
| 8,132,468 B2 | 3/2012 | Radivojevic | |
| 8,243,225 B2 | 8/2012 | Kai et al. | |
| 8,266,971 B1 | 9/2012 | Jones | |
| 8,305,358 B2 | 11/2012 | Klighhult et al. | |
| 8,411,064 B2 | 4/2013 | Noguchi et al. | |
| 8,421,483 B2 | 4/2013 | Klinghult et al. | |
| 8,434,369 B2 | 5/2013 | Hou et al. | |
| 8,456,430 B2 | 6/2013 | Oliver et al. | |
| 8,482,545 B2 | 7/2013 | King-Smith et al. | |
| 8,519,974 B2 | 8/2013 | Berggren | |
| 8,531,429 B2 | 9/2013 | Chang | |
| 8,605,053 B2 | 12/2013 | Murphy et al. | |
| 8,640,549 B2 | 2/2014 | Inamori | |
| 8,648,816 B2 | 2/2014 | Homma et al. | |
| 8,669,952 B2 | 3/2014 | Hashimura et al. | |
| 8,669,962 B2 | 3/2014 | Kuan | |
| 8,681,122 B2 | 3/2014 | Pirogov et al. | |
| 8,692,646 B2 | 4/2014 | Lee et al. | |
| 8,695,433 B2 | 4/2014 | Shimazu | |
| 8,711,128 B2 | 4/2014 | Small et al. | |
| 8,780,060 B2 | 7/2014 | Maschmeyer et al. | |
| 8,780,074 B2 | 7/2014 | Castillo et al. | |
| 8,780,543 B2 | 7/2014 | Molne et al. | |
| 8,870,087 B2 | 10/2014 | Coogan et al. | |
| 8,878,803 B2 | 11/2014 | Kimura et al. | |
| 8,952,892 B2 | 2/2015 | Chai | |
| 8,982,044 B2 | 3/2015 | Katsurahira | |
| 8,982,088 B2 | 3/2015 | Kung | |
| 8,988,384 B2 | 3/2015 | Krah | |
| 9,001,088 B2 | 4/2015 | Lee et al. | |
| 9,007,333 B1 | 4/2015 | Wilson | |
| 9,057,653 B2 | 6/2015 | Schediwy | |
| 9,024,904 B2 | 5/2015 | Jung et al. | |
| 9,024,910 B2 | 5/2015 | Stephanou et al. | |
| 9,024,918 B2 | 5/2015 | Cok | |
| 9,030,427 B2 | 5/2015 | Yasumatsu | |
| 9,063,599 B2 | 6/2015 | Yanagi et al. | |
| 9,081,460 B2 | 7/2015 | Jeong et al. | |
| 9,099,971 B2 | 8/2015 | Lynn et al. | |
| 9,110,532 B2 | 8/2015 | Ando et al. | |
| 9,110,545 B2 | 8/2015 | Radivojevic | |
| 9,116,569 B2 | 8/2015 | Stacy et al. | |
| 9,116,570 B2 | 8/2015 | Lee et al. | |
| 9,128,547 B2 | 9/2015 | Kodani et al. | |
| 9,134,826 B2 | 9/2015 | Andoh | |
| 9,158,407 B2 | 10/2015 | Coulson | |
| 9,182,849 B2 | 11/2015 | Huang et al. | |
| 9,182,859 B2 | 11/2015 | Coulson et al. | |
| 9,200,970 B2 | 12/2015 | Kodani et al. | |
| 9,223,162 B2 | 12/2015 | DeForest et al. | |
| 9,223,445 B2 | 12/2015 | Sleeman et al. | |
| 9,246,486 B2 | 1/2016 | Yang et al. | |
| 9,262,002 B2 | 2/2016 | Momeyer et al. | |
| 9,262,003 B2 | 2/2016 | Kitchens | |
| 9,292,115 B2 | 3/2016 | Kauhanen | |
| 9,304,348 B2 | 4/2016 | Jang | |
| 9,304,637 B2 | 4/2016 | Huang | |
| 9,329,719 B2 | 5/2016 | Molne et al. | |
| 9,342,179 B2 | 5/2016 | Fuji et al. | |
| 9,360,977 B2 | 6/2016 | Aberg | |
| 9,367,173 B2 | 6/2016 | Setlak | |
| 9,383,848 B2 | 7/2016 | Daghigh | |
| 9,406,013 B2 | 8/2016 | Suwald | |
| 9,415,517 B2 | 8/2016 | Naidu | |
| 9,417,696 B2 | 8/2016 | DeLuca | |
| 9,417,725 B1 | 8/2016 | Watazu et al. | |
| 9,454,268 B2 | 9/2016 | Badaye et al. | |
| 9,459,734 B2 | 10/2016 | Day | |
| 9,466,783 B2 | 10/2016 | Olien et al. | |
| 9,471,169 B2 | 10/2016 | Schediwy et al. | |
| 9,477,342 B2 | 10/2016 | Daverman et al. | |
| 9,501,167 B2 | 11/2016 | Day | |
| 9,507,456 B2 | 11/2016 | Watazu et al. | |
| 9,519,378 B2 | 12/2016 | Watazu et al. | |
| 9,542,028 B2 | 1/2017 | Filiz et al. | |
| 9,557,857 B2 | 1/2017 | Schediwy | |
| 9,562,814 B2 | 2/2017 | Kulkarni et al. | |
| 9,563,317 B2 | 2/2017 | Sleeman et al. | |
| 9,612,170 B2 | 4/2017 | Vosgueritchian et al. | |
| 9,632,629 B2 | 4/2017 | Prendergast | |
| 9,639,224 B2 | 5/2017 | Lee | |
| 9,654,883 B2 | 5/2017 | Fuji et al. | |
| 9,658,722 B2 | 5/2017 | Schwartz | |
| 9,665,200 B2 | 5/2017 | Filiz et al. | |
| 9,671,918 B2 | 6/2017 | Tsuchihashi et al. | |
| 9,690,408 B1 | 6/2017 | Krah | |
| 9,690,413 B2 | 6/2017 | Filiz | |
| 9,690,414 B2 | 6/2017 | Kano et al. | |
| 9,727,157 B2 | 8/2017 | Ham | |
| 9,729,730 B2 | 8/2017 | Levesque et al. | |
| 9,791,968 B2 | 10/2017 | Yang | |
| 9,841,850 B2 | 12/2017 | Schediwy et al. | |
| 9,851,843 B2 | 12/2017 | Mishra et al. | |
| 9,864,450 B2 | 1/2018 | Watazu et al. | |
| 9,881,577 B2 | 1/2018 | Wang et al. | |
| 9,916,942 B2 | 3/2018 | Shedletsky | |
| 9,965,092 B2 | 5/2018 | Smith | |
| 10,007,380 B2 | 6/2018 | Yoon et al. | |
| 10,032,592 B2 | 7/2018 | Brooks et al. | |
| 10,175,736 B2 | 1/2019 | Kim | |
| 10,185,397 B2 | 1/2019 | Yoneoka et al. | |
| 2002/0149571 A1 | 10/2002 | Roberts | |
| 2006/0043508 A1 | 3/2006 | Ohta et al. | |
| 2007/0159561 A1 | 7/2007 | Chien | |
| 2008/0165159 A1 | 7/2008 | Soss et al. | |
| 2008/0218488 A1 | 9/2008 | Yang et al. | |
| 2009/0002199 A1 | 1/2009 | Lainonen et al. | |
| 2009/0189866 A1 | 7/2009 | Haffenden et al. | |
| 2009/0267902 A1 | 10/2009 | Nambu et al. | |
| 2009/0316380 A1 | 12/2009 | Armstrong | |
| 2010/0103115 A1 | 4/2010 | Hainzl | |
| 2010/0117809 A1 | 5/2010 | Dai et al. | |

(56) References Cited

U.S. PATENT DOCUMENTS

| | | | |
|---|---|---|---|
| 2010/0123686 | A1 | 5/2010 | Klinghult et al. |
| 2011/0045285 | A1 | 2/2011 | Saiki et al. |
| 2011/0248839 | A1 | 10/2011 | Kwok et al. |
| 2011/0261021 | A1 | 10/2011 | Modarres et al. |
| 2011/0285660 | A1 | 11/2011 | Prabhu et al. |
| 2012/0019448 | A1 | 1/2012 | Pitkanen et al. |
| 2012/0038577 | A1 | 2/2012 | Brown et al. |
| 2012/0105367 | A1 | 5/2012 | Son et al. |
| 2012/0127136 | A1 | 5/2012 | Schneider et al. |
| 2012/0154299 | A1 | 6/2012 | Hsu et al. |
| 2012/0188198 | A1 | 7/2012 | Jeong et al. |
| 2012/0293491 | A1 | 11/2012 | Wang et al. |
| 2013/0009905 | A1* | 1/2013 | Castillo ............ G06F 3/044 345/174 |
| 2013/0074988 | A1 | 3/2013 | Chou |
| 2013/0082970 | A1 | 4/2013 | Frey et al. |
| 2013/0141365 | A1 | 6/2013 | Lynn et al. |
| 2013/0147739 | A1 | 6/2013 | Aberg et al. |
| 2013/0154933 | A1 | 6/2013 | Sheik-Nainar |
| 2013/0154998 | A1* | 6/2013 | Yang ............ H03K 17/9625 345/174 |
| 2013/0155059 | A1 | 6/2013 | Wang et al. |
| 2013/0215056 | A1 | 8/2013 | Johansson et al. |
| 2013/0222306 | A1 | 8/2013 | Aberg et al. |
| 2013/0328803 | A1 | 12/2013 | Fukushima et al. |
| 2013/0333922 | A1 | 12/2013 | Kai et al. |
| 2014/0085253 | A1 | 3/2014 | Leung et al. |
| 2014/0118635 | A1 | 5/2014 | Yang |
| 2014/0191973 | A1 | 7/2014 | Zellers et al. |
| 2014/0327847 | A1 | 11/2014 | Park et al. |
| 2015/0002452 | A1 | 1/2015 | Klinghult |
| 2015/0101849 | A1 | 4/2015 | Bockmeyer et al. |
| 2015/0116260 | A1 | 4/2015 | Hoen et al. |
| 2015/0242037 | A1 | 8/2015 | Pedder et al. |
| 2015/0268725 | A1 | 9/2015 | Levesque et al. |
| 2015/0301684 | A1 | 10/2015 | Shimamura |
| 2015/0331517 | A1 | 11/2015 | Filiz et al. |
| 2015/0370412 | A1 | 12/2015 | Ohba et al. |
| 2016/0003697 | A1 | 1/2016 | Okamoto et al. |
| 2016/0011708 | A1 | 1/2016 | Chung |
| 2016/0033389 | A1 | 2/2016 | Serpe |
| 2016/0034073 | A1 | 2/2016 | Andoh |
| 2016/0035290 | A1 | 2/2016 | Kim et al. |
| 2016/0041672 | A1 | 2/2016 | Hoen et al. |
| 2016/0048266 | A1 | 2/2016 | Smith et al. |
| 2016/0062517 | A1 | 3/2016 | Meyer et al. |
| 2016/0077649 | A1 | 3/2016 | Ando et al. |
| 2016/0117035 | A1 | 4/2016 | Watazu et al. |
| 2016/0132151 | A1 | 5/2016 | Watazu et al. |
| 2016/0147353 | A1 | 5/2016 | Filiz et al. |
| 2016/0306481 | A1 | 10/2016 | Filiz et al. |
| 2016/0357297 | A1 | 12/2016 | Picciotto et al. |
| 2017/0031495 | A1 | 2/2017 | Smith |
| 2017/0068318 | A1 | 3/2017 | McClure et al. |
| 2017/0075465 | A1 | 3/2017 | Pedder et al. |
| 2017/0090638 | A1 | 3/2017 | Vosgueritchian et al. |
| 2017/0090655 | A1 | 3/2017 | Zhang et al. |
| 2017/0191884 | A1 | 7/2017 | Vosgueritchian et al. |
| 2017/0261387 | A1 | 9/2017 | Vosgueritchian et al. |
| 2017/0269757 | A1 | 9/2017 | Filiz et al. |
| 2017/0285799 | A1* | 10/2017 | Iuchi ............ G06F 3/0414 |
| 2017/0285864 | A1 | 10/2017 | Pedder et al. |
| 2018/0059839 | A1 | 3/2018 | Kim et al. |
| 2018/0067612 | A1 | 3/2018 | Smith |
| 2018/0074638 | A1 | 3/2018 | Chiang et al. |
| 2018/0157363 | A1 | 6/2018 | Vosgueritchian et al. |
| 2018/0217708 | A1 | 8/2018 | Hoen et al. |
| 2019/0025140 | A1 | 1/2019 | Smith |
| 2019/0042046 | A1 | 2/2019 | Filiz et al. |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 101201277 A | 6/2008 |
| CN | 101243383 | 8/2008 |
| CN | 101950224 | 1/2011 |
| CN | 102012772 | 4/2011 |
| CN | 102047088 | 5/2011 |
| CN | 102117158 | 7/2011 |
| CN | 102165400 | 8/2011 |
| CN | 102175362 A | 9/2011 |
| CN | 102308269 | 1/2012 |
| CN | 102368191 | 3/2012 |
| CN | 102460351 | 5/2012 |
| CN | 102591519 | 7/2012 |
| CN | 102822779 | 12/2012 |
| CN | 103026327 | 4/2013 |
| CN | 103069365 | 4/2013 |
| CN | 103197821 | 7/2013 |
| CN | 103336562 | 10/2013 |
| CN | 103582807 | 2/2014 |
| CN | 103955321 | 7/2014 |
| CN | 204461655 U | 7/2015 |
| CN | 104866134 | 8/2015 |
| CN | 204576454 U | 8/2015 |
| CN | 105444662 | 3/2016 |
| CN | 205068342 | 3/2016 |
| CN | 105793803 | 7/2016 |
| EP | 0332365 | 9/1989 |
| EP | 0467562 | 1/1992 |
| EP | 1840714 | 10/2007 |
| EP | 2120136 | 11/2009 |
| EP | 2381340 | 10/2011 |
| EP | 2629075 | 8/2013 |
| FR | 2907563 | 4/2008 |
| JP | 2013503388 | 1/1900 |
| JP | H09511086 | 11/1997 |
| JP | 2008226641 | 9/2008 |
| JP | 201039458 A | 2/2010 |
| JP | 2010197066 | 9/2010 |
| JP | 2011258530 | 12/2011 |
| JP | 2012053646 | 3/2012 |
| JP | 2012517584 | 8/2012 |
| JP | 2014135010 | 7/2014 |
| WO | WO 96/038833 | 12/1996 |
| WO | WO 02/035461 | 5/2002 |
| WO | WO 07/074800 | 7/2007 |
| WO | WO 08/076393 | 6/2008 |
| WO | WO 11/156447 | 12/2011 |
| WO | WO 12/168892 | 12/2012 |
| WO | WO 13/177322 | 11/2013 |
| WO | WO 14/016429 | 1/2014 |
| WO | WO 15/106183 | 7/2015 |
| WO | WO 15/158952 | 10/2015 |
| WO | WO 16/029354 | 3/2016 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Rausch, "Printed piezoresistive strain sensors for monitoring of light-weight structures," Sensor+Test Conferences 2011—Sensor Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

* cited by examiner

ROW COLUMN ARCHITECTURE FOR STRAIN SENSING

FIELD

The present disclosure generally relates to electronic devices comprising input surfaces that use resistance-based parameter sensors, such as strain sensors, to detect inputs. Multiple such sensors may be arranged as an array of sensors. The present disclosure also relates to circuit architectures for such an array.

BACKGROUND

Electronic devices are commonplace in today's society. Example electronic devices include cell phones, tablet computers, personal digital assistants, smart watches, kiosk display screens, and the like. User interfaces of such electronic devices may often have touch-based input surfaces that use resistance-based sensors, such as of strain or another physical parameter, to detect inputs. Resistance-based sensors may detect a resistance value or changes in the resistance value.

For example, resistance-based strain sensors often comprise a thin film having conductive path. When the film is attached to a deformable surface, deflection of the surface alters or stretches the conductive path, changing its resistance. The change in resistance correlates with the force on the deformable surface, and can be detected by circuitry such as a Wheatstone bridge. However, this approach creates scaling problems as the number of such strain sensors is increased since conventionally a bridge circuit uses a dedicated applied voltage source for each resistance to be measured. When multiple strain sensors are to be measured, either a single voltage source and bridge can be applied sequentially to the sensors, or multiple voltage sources and bridges can be used. The former case can lead to time delays in measuring touch inputs on an input surface. The latter case can lead to unacceptable circuit size and complexity.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are devices, resistance-based sensing structures, and methods for using current sensing to detect physical parameters in objects using resistance-based parameter sensors. In one set of embodiments, disclosed herein are electronic devices having input surfaces that use multiple resistance-based strain sensors to detect or measure input touches or forces on the input surfaces. Another set of embodiments are disclosed that use multiple resistance-based temperature sensors to detect or measure temperatures or a change in temperatures. These and other embodiments may use a parallel current-based sensing configuration. Methods based on current sensing for determining a physical parameter in resistance-based parameter sensors are also disclosed.

A first embodiment discloses a resistance-based parameter sensing structure that can detect a physical parameter in an object. The resistance-based parameter sensing structure includes a resistance-based parameter sensor that contains a first parameter-sensitive element connected in parallel with a second parameter-sensitive element. The resistance-based parameter sensing structure also includes drive circuitry coupled to the resistance-based parameter sensor that can apply a source signal to the resistance-based parameter sensor. The resistance-based parameter sensing structure also includes current sensing circuitry coupled to the resistance-based parameter sensor. When the source signal is applied the current sensing circuitry receives a first current from the first parameter sensing element and a second current from the second parameter sensing element. Based on the first and second currents the current sensing circuitry can estimate a value of the physical parameter in the object.

Additional and/or alternative embodiments can include various combinations of the following. The first and second parameter-sensitive elements include either a conductive material or a piezoresistive material. The source signal is a voltage signal. The source signal is applied at an input node of the resistance-based parameter sensor that is connected to the first parameter-sensitive element and the second parameter-sensitive element. A first current is received from a first output node of the first parameter-sensitive element, a second current is received from a second output node of the second parameter-sensitive element. The first and second output nodes are electrically separated.

In additional and/or alternative embodiments, a first current sink is connected to the first output node and a second current sink is connected to the second output node. The first and the second currents may be measured by circuitry such as a single differential amplifier. In other embodiments the first current is received at a first amplifier with feedback, and the second current is received at a second amplifier having feedback.

In additional and/or alternative embodiments, such as for detecting strain, the first strain-sensitive element is on a first side of the resistance-based strain sensor, and the second strain-sensitive element is a second side of the resistance-based strain sensor that is opposite to the first side.

A second embodiment discloses a method of determining or measuring a physical parameter with a resistance-based parameter sensor. The resistance-based parameter sensor includes a first parameter-sensitive element and a second parameter-sensitive element connected in parallel. Stages of the method include: applying a signal to the resistance-based parameter sensor; receiving a first current from a first output electrode of the first parameter-sensitive element and a second current from a second output electrode of the second parameter-sensitive element; and determining the parameter using the first current and the second current. Determining the parameter can include the operations of: determining a difference of the first current and the second current; determining a sum of the first current and the second current; and determining a ratio of the difference and the sum.

Additional and/or alternative embodiments of the method can include various combinations of the following. The signal is a time-varying voltage signal. The first current and the second current are received in a current sensing circuit. The current sensing circuit may comprise an amplifier that compares the first current and the second current. The current sensing circuit may comprise a first and a second amplifier in which the first and the second amplifier respectively amplify the first and second currents, with the amplified first and second currents being used as in further current sensing circuitry. The method may also include the operations of shunting a first offset current from the first current by using a first current sink connected at the first output electrode of the first parameter-sensitive element, and shunting a second offset current from the second current by using a second current sink connected at the second output electrode of the first parameter-sensitive element.

A third embodiment discloses an electronic device that includes an input surface, and a first and a second resistance-based strain sensor positioned below the input surface. The first and second resistance-based strain sensors each include: a respective signal input electrode, and a first strain-sensitive element and a second strain-sensitive element connected in parallel to the respective signal input electrode. The electronic device further includes a first signal source that applies a first signal to the input electrode of the first resistance-based strain sensor, and a second signal source that applies a second signal to the input electrode of the second resistance-based strain sensor. The electronic device also includes a first current junction that receives a current from a strain-sensitive element of the first resistance-based strain sensor and another current from a strain-sensitive element of the second resistance-based strain sensor. The electronic device also includes a second current junction that receives a current from the other strain-sensitive element of the first resistance-based strain sensor and another current from the other strain-sensitive element of the second resistance-based strain sensor. The electronic device also contains current sensing circuitry couple to the first current junction and the second current junction. The electronic device also contains a processing structure that can determine the strain at a location on the input surface based on the sum of the currents into the first current junction and on the sum of the currents into the second current junction.

In the embodiment just described, the first and second resistance-based strain sensors may further be components of a first column in an array of resistance-based strain sensors. The embodiment just described may implement current sensing to detect and/or measure the strain.

Additional and/or alternative embodiments of the third embodiment may include a third and a fourth resistance-based strain sensor configured as a second column in the manner just described to form a two-column array. Further, the first and third resistance-based strain sensor are configured to form a first row of the array in which each has its signal input electrode driven by the first signal source, and the second and fourth resistance-based strain sensors are configured to form another row of the array in which each has its signal input electrode driven by the second signal source. There are third and fourth current junctions receiving currents from the third and fourth resistance-based strain sensors. The processing structure also uses currents out of the third and fourth current junctions as part of determining the strain.

A row-column array arrangement as just described can use a simple processing structure that may include fewer current receivers in comparison to arrangements using bridge circuit configurations for voltage sensing at each resistance-based strain sensor.

In additional and/or alternative embodiments the first and second signal sources each provide voltage signals. The signals may be applied simultaneously, either with the same or opposite polarity. A sequence of measurements can be made by first applying both signals simultaneously with the same polarity and measuring the sensors' currents, followed by a subsequent measurement made by applying both signals simultaneously but with opposite polarity and measuring the sensors' currents. Strain in a particular strain sensor is than estimated by the results of both measurements.

In additional and/or alternative embodiments, the first and second signal sources are positioned on a first plane, such as a surface of a substrate layer, beneath the input surface. Electrical connections may then be on the first plane connecting the first and second signal sources to the first and second resistance-based strain sensors. The first and second current junctions are positioned on a second plane that is beneath the input surface and parallel to the first plane. Conducting vias connect the strain-sensitive elements of the first and second resistance-based strain sensors to the first and second current junctions.

BRIEF DESCRIPTION OF THE DRAWINGS

The disclosure will be readily understood by the following detailed description in conjunction with the accompanying drawings, wherein like reference numerals designate like structural elements.

Figure 1:
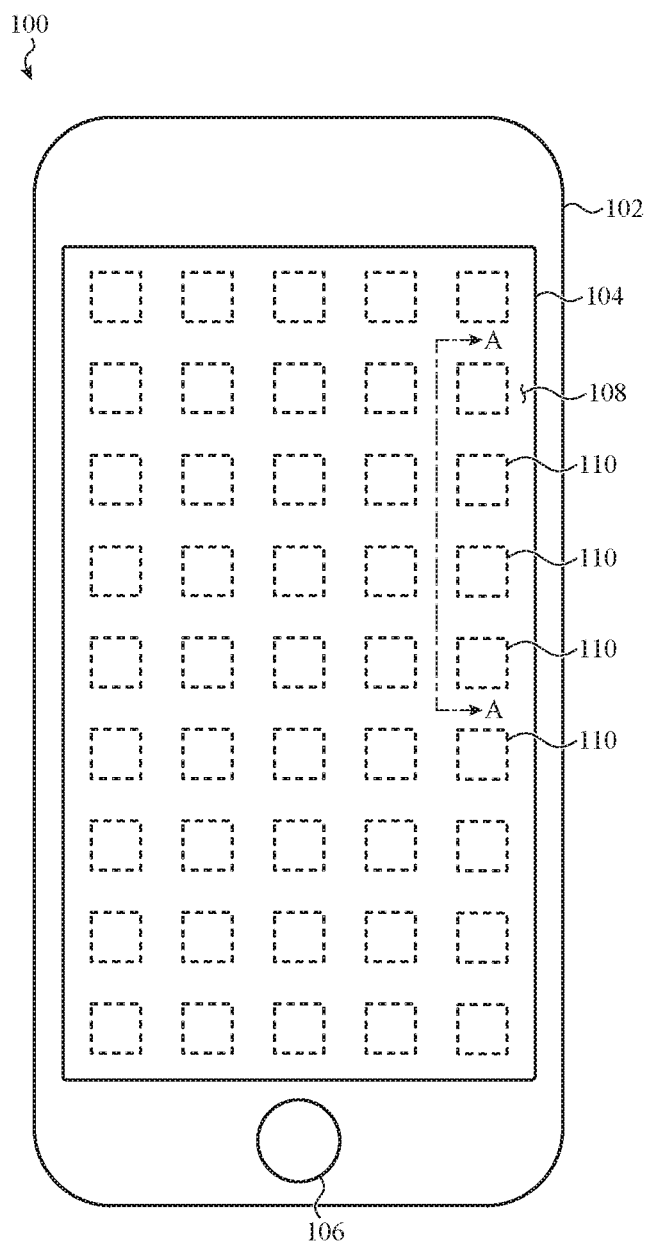
FIG. 1 illustrates an electronic device having multiple parameter sensors linked to an input surface, according to an embodiment.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to devices, resistance-based sensing structures, and methods for measuring a physical parameter using resistance-based parameter sensors. Examples of such physical parameters include strain in a surface and temperature, but are not limited to just those. A physical parameter will mean any measurable or detectable physical phenomenon. Examples include, but are not limited to, strain, resistance, temperature, current, voltage, force, and frequency, among others. Herein "parameter" will be used as equivalent to "physical parameter" unless otherwise noted. The devices, structures, and methods may be used in electronic devices having touch-based input surfaces, as well as in other devices. For example, the devices, resistance-based sensing structures, and methods disclosed herein may be used in, but are not limited to, mobile phones, personal digital assistants, a time keeping device, a health monitoring device, a wearable electronic device, an input device (e.g., a stylus), a desktop computer, and so on. Although various electronic devices are mentioned, the resistance-based sensing structures and methods of the present disclosure may also be used in conjunction with other products and combined with various materials. Although the present disclosure will describe in particular detail embodiments in which the physical parameter is strain in a surface, such as an input surface of electronic device, and the resistance-based parameter sensors are strain sensors, the disclosure is not limited to strain sensing structures and strain sensors.

Many electronic devices have a displays through which output images to a user are displayed. Such displays may also have an input surface that detects input forces, such as from a user's finger or stylus, as inputs. The detection can be implemented by one or more strain sensors positioned within the electronic device and linked with the input surface. For example, the strain sensors may be attached to a substrate layer below the input surface. An input force can deflect the input surface and the substrate layer at a location on the input surface. The deflection can cause a strain detectable by one or more of the strain sensors. The electronic device can then determine the location and intensity of the applied force.

Additionally and/or alternatively, detection of input to a display screen may be implemented by one or more resistance-based temperature sensors positioned below a display screen. A user's finger touching the screen can induce a determinable change in temperature at the location of the touch.

Such parameter sensors may be resistance-based, in that they contain one or more parameter-sensitive elements having a resistance that correlates with the parameter being measured. For example, some resistance-based strain sensors comprise one or more conductors whose resistance measurably changes in response to strain in an object. As another example, some resistance-based temperature sensors similarly comprise conductive material whose resistance varies according to temperature. Such resistance-based parameter sensors may also be configured in an array underlying the input surface to enable detection of a force or input at any point on the input surface. Determining a parameter can include either detecting the parameter, such as a force on an input surface, or measuring a value of the parameter.

The following disclosure, for simplicity and brevity of explanation only, will describe embodiments in which the physical parameter to be detected and/or measured is strain. It will be clear to one of skill in the art how these embodiments can be used or applied for other physical parameters.

The strain experienced by an individual strain sensor can be measured by a bridge circuit structure, such as a Wheatstone bridge. A first form of such a bridge circuit structure uses a strain sensor having two strain-sensitive elements configured as two resistors in series, with the series in parallel with a separate pair of reference resistors also connected in series. Strain in the strain sensor changes a resistance of a strain-sensitive element, which can be detected across the midpoints of each parallel branch. This bridge circuit structure often uses a voltage source signal applied to the two parallel branches, and measures a voltage difference across the midpoints of each series.

This bridge circuit structure has the advantage that strain in the strain sensor is proportional to a dimensionless ratio of resistance values. As a dimensionless ratio, a common mode temperature change in the resistance typically cancels out to low orders of expansion.

A second bridge circuit structure can configure the strain sensor so that its two strain-sensitive elements are effectively in parallel. When a source signal is applied, separate output currents from each parallel branch can be detected. Strain in the strain sensor can then be detected by changes in the separate output currents.

In particular configurations of the second bridge circuit structure, the strain can be made to depend on a dimensionless ratio and so preserve the reduction of temperature effects.

Another advantage of the second bridge circuit structure is that output currents from multiple strain sensors, such as sensors in an array linked to an input surface, can be summed by a single current detection circuit but nevertheless still sense strains in each of the multiple strain sensors. For rectangular arrays of strain sensors, this allows for each row of sensors to receive a respective common source signal, and for each column to have a respective common current receiver. Varying the source signal of each row over time in a predictable pattern allows the current receivers to detect the strains in the individual sensors.

Various embodiments disclosed herein relate to placement of the strain, or other parameter, sensors and the routing of their electrical interconnections to implement a row-column architecture for sensing and/or measuring the strain.

These and other embodiments are discussed below with reference to FIGS. 1-11. However, those skilled in the art will readily appreciate that the detailed description given herein with respect to these figures is for explanatory purposes only and should not be construed as limiting.

FIG. 1 illustrates an example electronic device 100 that may incorporate resistance-based strain sensors with current sensing. The exemplary electronic device 100 is a mobile phone. While the description below will refer to the specific exemplary electronic device shown in FIG. 1, it is to be understood that the embodiments described below may be implemented in different electronic devices, such as a laptop computer, a tablet computing device, a wearable computing device, a digital music player, a display input device, a kiosk, a remote control device, a television, and other types of electronic devices that include one or more strain-sensing structures.

The electronic device 100 includes an enclosure 102 at least partially surrounding an input surface 104. There may be one or more input/output (I/O) devices 106. The enclosure 102 can form an outer surface or partial outer surface for the internal components of the electronic device 100. The enclosure 102 can be formed of one or more components operably connected together, such as a front piece and a back piece. Alternatively, the enclosure 102 can be formed of a single piece operably connected to the input surface 104.

The input surface 104 may comprise a glass cover sheet 108, below which can be multiple substrate layers. These substrate layers may comprise, for example, a display layer, a stiffener layer, a touch layer, a lighting layer, and a sensor layer, among others.

Below the input layer the electronic device 100 may comprise an array of strain sensors, such as strain sensors 110, configured as part of structures and circuitry for detection of locations and sizes of forces applied to the input surface 104. The one or more of strain sensors 110 may be resistance-based strain sensors in which an internal strain-sensitive element has a resistance that depends on the strain in the strain sensor. When such a resistance-based strain sensor is linked with the input surface 104, either directly or through intermediate substrates or layers, a force applied to the input surface 104 can induce a strain in the resistance-based strain sensor. Embodiments of such resistance-based strain sensors will now be described.

Figure 2:
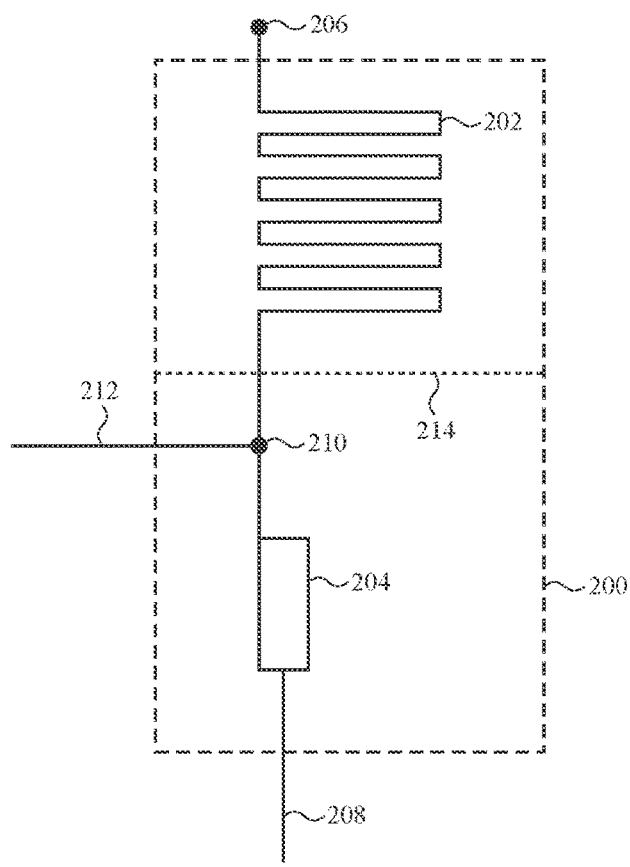
FIG. 2 is a functional diagram of a resistance-based parameter sensor, according to an embodiment.

FIG. 2 is a functional diagram of an embodiment of a resistance-based strain sensor 200. The components of strain sensor 200 are presented in simplified form for explanation purposes. Strain sensor 200 may be implemented as a thin non-conductive film that contains a first strain-sensitive element 202 and a second strain-sensitive element 204 that are connected in series at an internal node 210.

For connection to external circuitry, strain sensor 200 comprises a first electrode 206 connected to the first strain-sensitive element 202 opposite from the internal node 210, a second electrode 208 connected to the second strain-sensitive element 204 opposite to the internal node 210 and a third electrode 212 that connects to the internal node 210.

The strain sensor 200 may be formed as a single unit. Alternatively, strain sensor 200 may be implemented as two components connected together. As an example of the latter embodiment, separation line 214 indicates where a first component with only the strain-sensitive element 202 is linked with a second component containing strain-sensitive element 204, and the leads 212 and 208, as well as a lead to link with the first component.

In some embodiments, the strain sensor 200 may be connected to external circuitry as a series connection of the first strain-sensitive element 202 and the second strain-sensitive element 204, with the first electrode 206 configured as an input (alternatively, as the output) and the second electrode 208 configured as an output (alternatively, as the input). When so connected, the third electrode 212 can serve as a connection at which to measure a value (such as voltage or current) across the divider formed by the first strain-sensitive element 202 and the second strain-sensitive element 204.

In additional and/or alternative embodiments, the strain sensor 200 may be connected to external circuitry as a parallel connection of the first strain-sensitive element 202 and the second strain-sensitive element 204. When so connected, the third electrode 212 can function as an input electrode, the first electrode 206 can function as a first output electrode, and the second electrode 208 can function as second output electrode.

The first strain-sensitive element 202 may be a resistive strip of a metallic conductor, configured in a serpentine pattern. As such, a strain (i.e., a stretch, compression or displacement of the encasing film) applied to the strain sensor 200 can cause a detectable change in the resistance of the strip. Alternatively, the first strain-sensitive element 202 can include a piezoresistive material that has a resistance that varies with a strain applied to strain sensor 200.

The second strain-sensitive element 204 may also be a resistive strip or include a piezoresistive material so that its resistance also changes as a strain is applied to strain sensor 200. In alternative embodiments, the second strain-sensitive element 204 may be configured as metallic or other conductive strip whose resistance does not change when a strain is applied to strain sensor 200. In such alternative embodiments the second strain-sensitive element 204 can be used as a reference resistor against which the varying resistance of the first strain-sensitive element 202 can be measured.

In additional and/or alternative embodiments, the functional circuit diagram of the strain sensor 200 just described may also be the functional circuit diagram for a resistance-based temperature sensor. Such a temperature sensor can have two resistors configured in series as just described, with at least one of the resistors having a resistance that varies with its temperature. To prevent current heating, in some embodiments the applied voltage source can be a pulsed voltage source with the a short duty cycle.

Figure 3A:
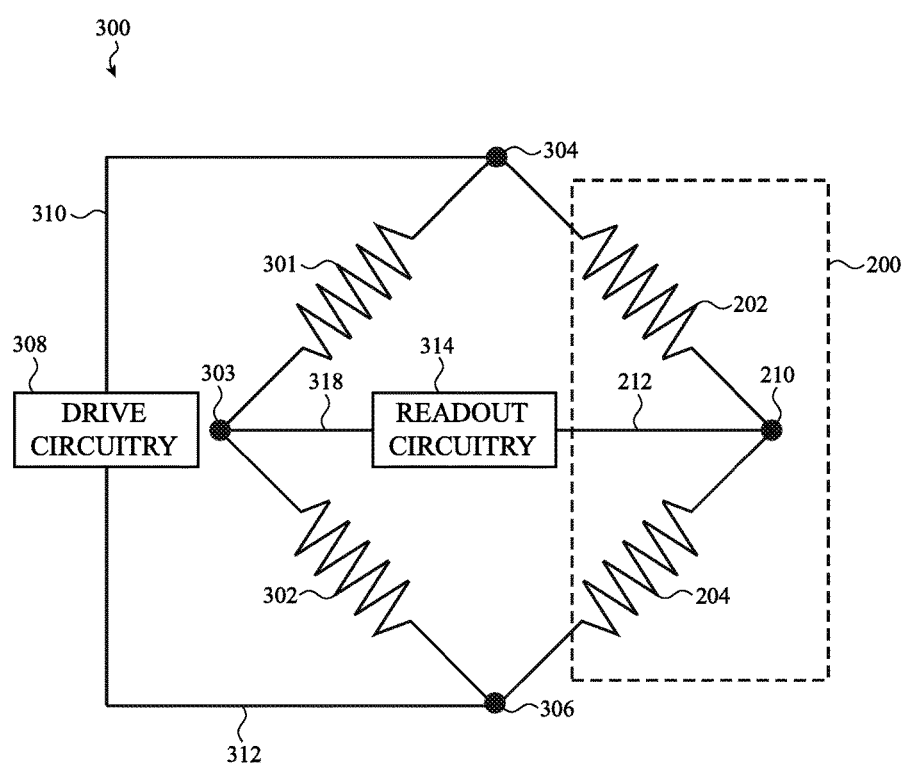
FIGS. 3A-C illustrate block diagrams of a bridge circuit structure for measuring a parameter in a resistance-based strain sensor, according to various embodiments.

FIG. 3A shows a first strain sensing structure 300 in which a bridge circuit structure is used with strain sensor 200 to detect strain. The strain sensing structure 300 comprises drive circuitry 308. Drive circuitry 308 can apply a signal, such as a voltage or current signal, through lead 310 to top node 304 of the bridge circuit structure 300. From the top node 304 the strain sensing structure 300 includes two parallel branches that both connect to bottom node 306. From bottom node 306 lead 312 completes the circuit back to the drive circuitry 308. The first branch, the reference branch, includes reference resistors 301 and 302 connected in series at node 303. The second branch, the strain sensing branch, is formed from strain sensor 200 with first strain-sensitive element 202 and second strain-sensitive element 204 connected in series, as described above. Strain in strain sensor 200 is detected by readout circuitry 314 connected between node 303 of the reference branch and lead 212 to node 210 of strain sensor 200.

Figure 3B:
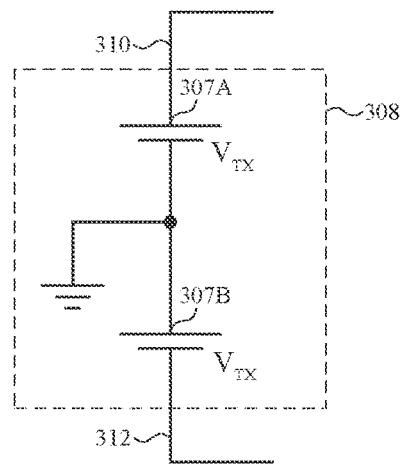

FIG. 3B shows one embodiment of drive circuitry 308. Two equal voltage sources 307A and 307B are connected in series at a grounded node, and have value $V_{TX}$. Though the calculations explained below refer to this embodiment, it will be clear to one of skill in the art that other embodiments for the drive circuitry 308 may be used, such as a single voltage source, and give equivalent results.

Figure 3C:
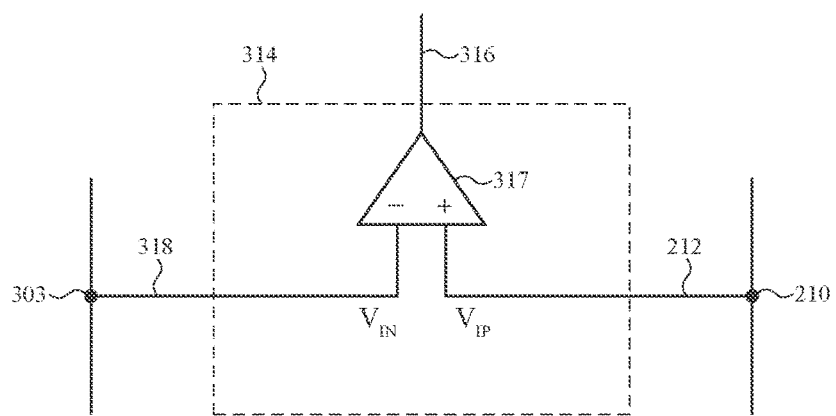

FIG. 3C shows one embodiment for readout circuitry 314. A differential amplifier 317 receives a first signal (voltage $V_{ip}$) from node 303 in the reference branch in its non-inverting input, and a second signal (voltage $V_{in}$) from node 210 of strain sensor 200 in its inverting input. The differential amplifier provides an amplified output value of $V_{ip}-V_{in}$ on lead 316. The output on lead 316 can be used to infer the strain in strain sensor 200.

When the resistance at 301 is denoted as $R_{ref1}$, the resistance at 302 as $R_{ref2}$, the resistance of strain-sensitive element 202 as $R_1$, and the resistance of strain-sensitive element 204 as $R_2$, a circuit analysis shows that:

$$V_{ip} = V_{in} = V_{Tx} \cdot \left( \frac{R_2 - R_1}{R_1 + R_2} - \frac{R_{ref2} - R_{ref1}}{R_{ref1} + R_{ref2}} \right). \quad (1)$$

In a first method of determining strain in the strain sensor 220, a measurement of the difference on the left hand side of equation (1), or an amplification of this difference, can be known to correlate with the strain in the strain sensor 200. This correlation can be known from experiment or design considerations of strain sensor 200. As a consequence the strain can be seen to have the following functional dependence:

$$\text{Strain}(V_{ip} - V_{in}) \propto \frac{R_2 - R_1}{R_2 + R_1}. \quad (2)$$

In a second method for determining the strain, when the difference $V_{ip}-V_{in}$ is measured at a first time, and then measured at a second time when a new or different strain is present in the strain sensor, these two voltage differences are subtracted to yield a change (delta) between the differences: $\Delta(V_{ip}-V_{in})$. The terms depending on the constant reference resistors cancel and produce the functional form:

$$\text{Strain}(\Delta(V_{ip} - V_{in})) \propto \frac{R_2 - R_1}{R_2 + R_1}. \quad (3)$$

Thus the strain in strain sensor 200 has a functional dependence on a dimensionless ratio of resistances. This is advantageous since temperature drifts in the resistance values will tend to cancel out to first order. Further, as shown by equations (2) and (3), the bridge circuit structure of FIG. 3A uses the approach of "voltage signaling and voltage sensing" to detect strain in strain sensor 200.

To measure strains in multiple resistance-based strain sensors of an array, such as sensors 110 in electronic device 100, using strain sensing structure 300 would require separate bridge circuit structures and readout circuits for each strain sensor. A single drive circuit could be used, with its source signal applied to all bridge circuit structures. This may be desirable in some embodiments for certain electronic devices. For other electronic devices, another bridge circuit structure may be more useful, as will now be described.

Figure 4:
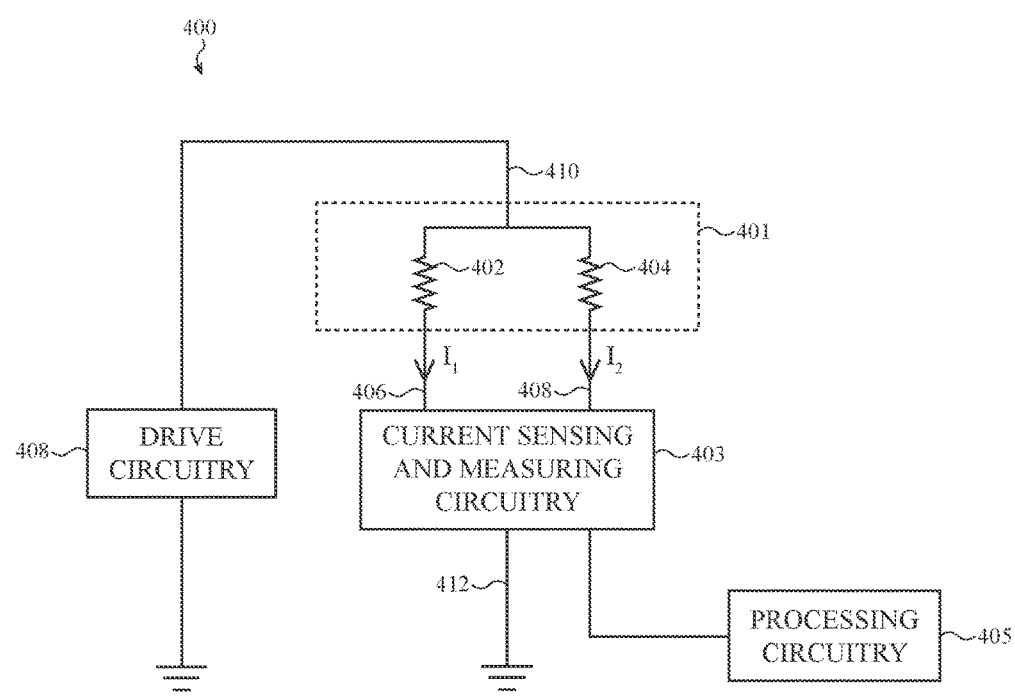
FIG. 4 illustrates a block diagram of a structure for determining a physical parameter, according to an embodiment.

FIG. 4 illustrates a second resistance-based strain sensing structure 400. The strain sensing structure 400 includes drive circuitry 408, which can apply a source signal to lead 410. The source signal can be a voltage signal or a current signal, and may be time-dependent. Strain sensing structure 400 applies the source signal to strain sensor 401. Strain sensor 401 is configured to have two strain-sensitive elements 402 and 404 connected in parallel from an electrode connected to lead 410. Such a parallel configuration is discussed above in relation to strain sensor 200. As will now be explained, the second strain sensing structure 400 can use the approach of "voltage signaling and current sensing."

Though the drive circuitry 408 may use a current source or a split voltage source as shown in FIG. 3B, or another structure, for simplicity of exposition in the following analysis the drive circuitry 408 will be assumed to be a single voltage source, $V_{TX}$. This is equivalent to voltage source 307B in FIG. 3B being a zero voltage. Further, for this analysis the strain sensor 401 will be assumed to be a resistance-based strain sensor, with at least one of strain-sensitive elements 402 and 404 having a resistance that depends on a strain in strain sensor 401.

When such a voltage source signal is applied from drive circuitry 408 to the input at lead 410 of resistance-based strain sensor 401, and the respective resistances through strain-sensitive elements 402 and 404 are denoted by $R_1$ and $R_2$, the difference in the currents is:

$$I_1 - I_2 = V_{TX}\left( \frac{1}{R_1} - \frac{1}{R_2} \right) = V_{TX} \cdot \frac{R_2 - R_1}{R_1 \cdot R_2}.$$

While accurate measurement of currents, or their difference, is possible, there would nonetheless be limitations to using current sensing in this form to detect strain. It would require knowing at least one the resistances within the strain sensor to obtain the strain from the current difference. Further, the ratio on the right hand side multiplying $V_{TX}$ is not dimensionless. As such, drifts in resistance values that arise with temperature variation would not tend to cancel.

A better approach would instead use a ratio of current values. If instead of the difference of the two currents $I_1$ and $I_2$ their sum was calculated, the sum would be:

$$I_1 + I_2 = V_{TX}\left( \frac{1}{R_1} + \frac{1}{R_2} \right) = V_{TX} \cdot \frac{R_2 + R_1}{R_1 \cdot R_2}.$$

The ratio of the difference of the currents to the sum of the currents would be:

$$\left( \frac{I_1 - I_2}{I_1 + I_2} \right) \propto \frac{R_2 - R_1}{R_1 + R_2}.$$

The right hand side is now dimensionless and temperature drifts in the resistance values will tend to cancel to first order. This ratio can be reliably and accurately related to the strain to yield the functional relationship:

$$\text{Strain}\left( \frac{I_1 - I_2}{I_1 + I_2} \right) \propto \frac{R_2 - R_1}{R_1 + R_2}. \quad (4)$$

To use such a relationship the current sensing and measuring circuitry can be configured for accurate measurement of the sum and difference of the currents from the resistance-based strain sensor 401. The following will illustrate one embodiment for doing so.

Figure 5:
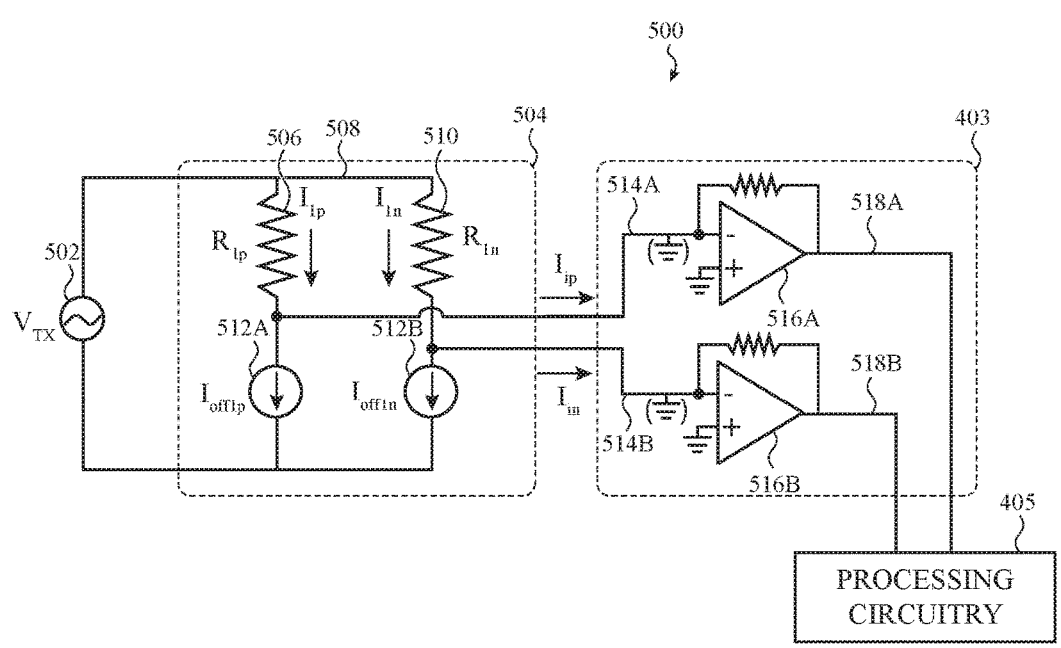
FIG. 5 illustrates a block diagram of a circuit for determining a physical parameter, according to an embodiment.

FIG. 5 shows a block diagram of a circuit 500 that implements current sensing with a strain sensor. In circuit 500, the drive circuitry is now the voltage source 502, $V_{TX}$, which may be time-varying. The circuit 500 contains two resistance-based strain-sensitive elements 506, 510, connected in parallel. One may have a fixed reference resistance. These may be contained in a dedicated strain sensor such as strain sensor 200 discussed above. The voltage source 502 applies its source signal through lead 508 to the strain-sensitive elements 506, 510.

Current source 512A may be connected from the output of strain-sensitive element 506 to ground. It will also be termed a current sink, as it shunts to ground a fixed amount of offset current, $I_{off1p}$, from the current, $I_{1p}$, through strain-sensitive element 506. Similarly, current source 512B may be connected from the output of strain-sensitive element 510 to shunt to ground a fixed amount of offset current, $I_{off1n}$, from the current, $I_{1n}$, through strain-sensitive element 510. The two current sinks 512A-B provide a bridge structure for current sensing analogous to the reference resistors 301 and 302 of FIG. 3A. The combination of a strain sensor with the strain-sensitive elements 506, 510, and the current sinks 512A-B form a current sensing bridge structure 504.

In the embodiment shown in FIG. 5, the current sensing and measurement apparatus 403 is implemented as a pair of differential amplifiers 516A-B. Differential amplifier 516A receives at its inverting input a current $I_{ip}$ on lead 514A that is a sample of the total current $I_{1p}$ through strain-sensitive element 506. The non-inverting input is connected to ground. A feedback from the output 518A of differential amplifier 516A is fed back to the inverting input at lead 514A. Differential amplifier 516A operates to maintain the output so that inverting input is at a virtual ground (indicated by the parentheses). Similarly, differential amplifier 516B receives at its inverting input 514B a current $I_{in}$ on lead 514B that is a sample of the total current $I_{1n}$ through strain-sensitive element 510. Negative feedback of the output at 518B is used to keep the inverting input at 514B at virtual ground. The outputs of the differential amplifiers 516A-B may be used by processing circuitry 405, such as for determining strain.

While FIG. 5 shows two differential amplifiers each configured in inverting mode, it will be clear to one of skill in the art that alternative configurations, having different numbers of amplifiers, can also be used. For example, a single high-precision amplifier, such as an instrumentation amplifier, could be used to receive both currents $I_{ip}$ and $I_{in}$.

In the notation of FIG. 5 the analysis leading to equation (4) now yields:

$$\text{Strain}\left(\frac{I_{1p} - I_{1n}}{I_{1p} + I_{1n}}\right) \propto \frac{R_{1n} - R_{1p}}{R_{1n} + R_{1p}}.$$

The currents on the left hand side are given as sums of measured or set values: $I_{1p}=I_{ip}+I_{off1p}$ and $I_{1n}=I_{in}+I_{off1n}$. The circuit 500 thus allows strain to be measured using current sensing. It can also be adapted to measure strain in multiple strain sensors, as will now be explained.

Figure 6:
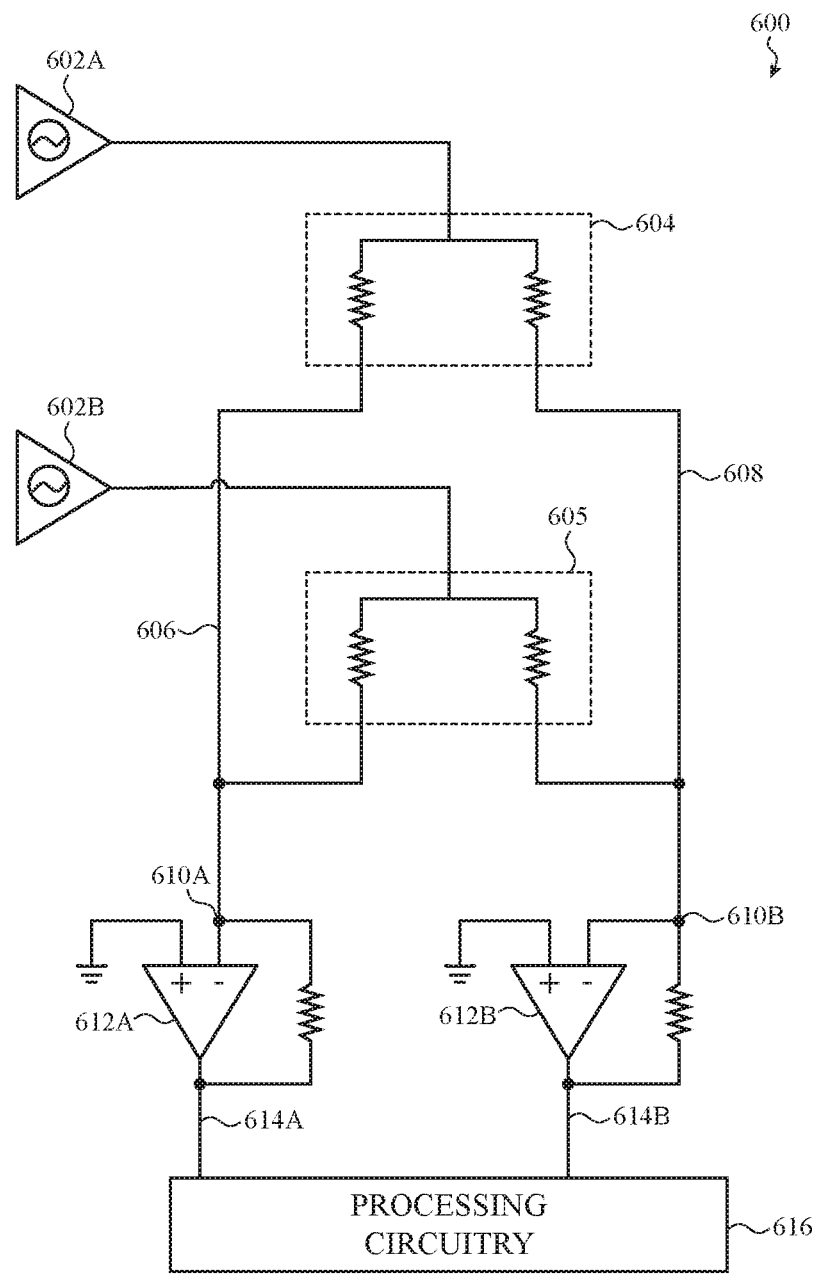
FIG. 6 illustrates a block diagram of structure for determining strain using two resistance-based strain sensors, according to an embodiment.

FIG. 6 shows block diagram of a circuit 600 that can be used to measure strain in two resistance-based strain sensors 604 and 605, each containing two resistance-based strain-sensitive elements. The strain sensors 604 and 605 may be provided with current sinks as shown in FIG. 5, but for simplicity of explanation they are not shown. Strain sensor 604 receives a source signal from first drive circuitry 602A, and strain sensor 605 receives a source signal from drive circuitry 602B.

Each of strain sensors 604 and 605 has a respective first output (e.g., the left output) connected to a conductive lead that can function as a current junction 606. The current junction 606 is connected to current node 610A at the inverting input of differential amplifier 612A. The non-inverting input of differential amplifier 612A can be set at ground, and negative feedback provided from output 614A to the current node 610A, as discussed in relation to FIG. 5. Similarly, each of the strain sensors 604 and 605 has its respective alternate output connected to a conductive lead that can function as a current junction 608. The current junction 608 is connected to current node 610B at the inverting input of differential amplifier 612B. The non-inverting input of differential amplifier 612B can be set at ground, and negative feedback provided from output 614B to the current node 610B.

The configuration of strain sensors 604 and 605 shown if FIG. 6 is termed a column connection. Additional such strain sensors can be added to the column connection shown in FIG. 6 with the first output of each strain sensor connected to current junction 606 and the second output of each strain sensor connected to current junction 608. Each additional strain sensor in the column would need an additional respective drive circuit to provide a source signal. However, adding additional strain sensors to the column connection would not require any further differential amplifiers for current sensing.

The currents from strain sensors 604 and 605 into current junction 606 are summed and the output of differential amplifier 612A is proportional to this sum. Similarly, the currents from strain sensors 604 and 605 into current junction 608 are summed and the output of differential amplifier 612B is proportional to that sum.

To measure strain individually in strain sensor 604, the drive circuitry 602A can apply, for example, a positive voltage to the input of strain sensor 604 while drive circuitry 602B applies a zero voltage to the input of strain sensor 605. Then no currents will be provided as outputs from strain sensor 605, so that the total current in current junction 606 arises only from strain sensor 604. The total current in current junction 608 also arises only from strain sensor 604. In this way the stain in strain sensor 604 can be estimated, such as by processing circuitry 616, as discussed in relation to the single strain sensor shown in FIG. 5.

Analogously, if drive circuitry 602A provides a zero voltage to strain sensor 604 but drive circuitry 602B applies a positive voltage to strain sensor 605, the strain in strain sensor 605 can be estimated. When more strain sensors are present in the column, the respective drive circuits can be sequentially applied to determine the strains in each strain sensor.

Figure 7:
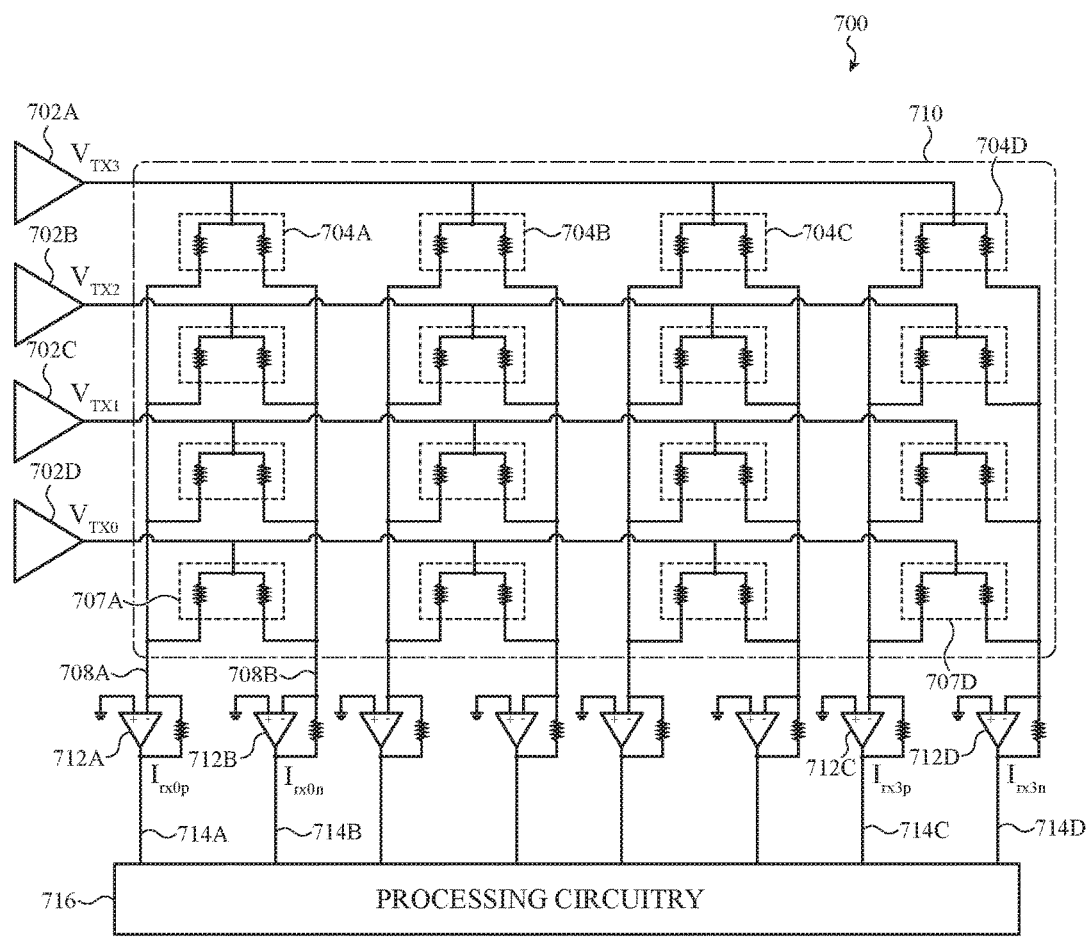
FIG. 7 illustrates a block diagram of a resistance-based sensing structure for determining strain that uses an array of resistance-based strain sensors, according to an embodiment.

FIG. 7 shows a simplified circuit diagram of an array 710 of resistance-based strain sensors, such as resistance-based strain sensors 704A-D, 707A, and 707D. Each resistance-based strain sensor may comprise a pair of resistance-based strain-sensitive elements, as described previously. For simplicity of explanation, the strain sensors of array 710 will be assumed to be such resistance-based strain sensors. However, one of skill in the art will recognize how the various embodiments described below can use alternative strain sensors.

The array 710 may be part of array used to detect forces applied to an input surface, such as input surface 104 of electronic device 100. The array 710 may be configured on one or more substrate layers of the electronic device 100.

The array 710 has four columns of strain sensors, the columns positioned from left to right. In the leftmost column is shown strain sensor 704A at the top, and strain sensor 707A at the bottom. In the rightmost column is shown strain sensor 704D at the top, and strain sensor 707D at the bottom. Strain sensors 704A-D form a single row of strain sensors having a common drive circuit 702A operative to apply a voltage transmit source signal $V_{TX3}$ simultaneously to the inputs of strain sensors 704A-D. Similarly, each of drive circuits 702B-D are operative to apply respective voltage transmit source signals, $V_{TX2}$, $V_{TX1}$, and $V_{TX3}$, to its respective row of strain sensors.

Each column of array 710 includes two current junctions, such as 708A and 708B for the left column, that receive output currents from the strain sensors in the column, as described in relation to FIG. 6. The current junctions may be configured as electrical traces on a substrate layer. Each column uses only two differential amplifiers, such as differential amplifiers 712A and 712B for the left column and differential amplifiers 712C and 712D for the right column.

Negative feedback from the outputs of differential amplifiers is applied, as described previously. The signals on the outputs of the differential amplifiers, such as respective outputs 714A-D of differential amplifiers 712A-D, are used to provide negative feedback, as described previously. The outputs of the differential amplifiers is received by processing circuitry 716, which can use the outputs to estimate strains in the strain sensors.

FIG. 7 illustrates an advantage of current sensing with a large array of strain sensors: only eight differential amplifiers and four drive circuits are used. If voltage sensing with each strain sensor had been used, sixteen differential amplifiers, one for each strain sensor, would have been needed; even if every strain sensor had its source signal supplied from a single drive circuit, more circuit elements would still have been needed.

In one set of embodiments, signals from the drive circuits 702A-D can be applied simultaneously to perform a sequence of measurements. In a first measurement, the signals are applied with the same polarity to each respective row. The sums of the sensors' output currents measured by the amplifiers and processing circuitry. The first measurement of the column sums of the sensors' output currents can provide an indication that strain is occurring in at least one sensor within the column. For example, the column sums of the sensors' output currents can be compared to known or anticipated sums that would occur if no strain is occurring in any strain sensor.

In a subsequent second measurement, the signals are again applied simultaneously, but with at least one signal, such as the signal from drive circuit 702B, having an opposite polarity. The sums of the sensors' output currents are measured by the amplifiers and processing circuitry for this second set of input signals. Additional similar measurements of the sums of the sensors' output currents can then be made by sequentially changing the signal of each drive circuit to have opposite polarity. The results of all the measurements can then be combined by the processing circuitry to estimate the strains in each sensor.

An array of strain sensors may be positioned and/or configured according to various embodiments, as will now be discussed.

Figure 8:
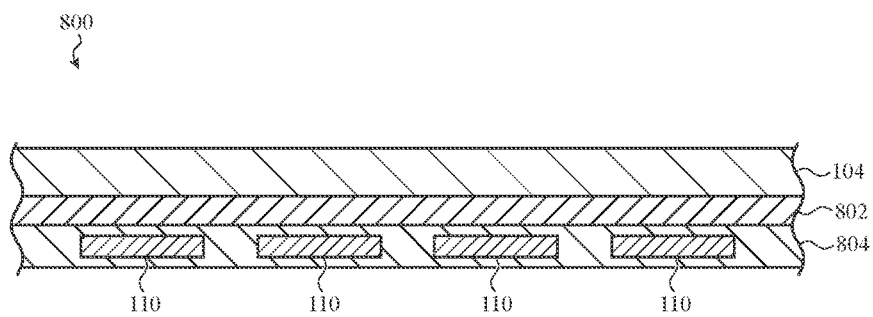
FIG. 8 is a cross-sectional view of an electronic device that uses multiple resistance-based strain sensors, according to an embodiment.

FIG. 8 is a cross-sectional view 800 of an embodiment of electronic device 100 along cut lines A-A. The input layer and two substrate layers, 802 and 804, are shown. In other embodiments more or fewer substrate layers may be used. The input layer 104 is receives input forces from a user, such as from a finger or a stylus. The input layer 104 may be all or mostly transparent in order that images generated by the electronic device 100 may be seen through it.

Beneath the input layer 104 may be a display layer 802 that contains discrete light sources that are used to generate images for the user. The discrete light source may be light emitting diodes, such as organic diodes. Other image generating technologies may be used in the display layer.

Beneath the display layer 802 is a touch sensing layer 804 in which are located individual strain sensors 110. The touch sensing layer may contain all or part of the components of an array of strains sensors, such as array 710. In this configuration of the strain sensors may be opaque, for example, to help reduce reflections of light produced in the display layer 802.

In another set of embodiments, the touch sensing layer 804 may be positioned as the first substrate layer beneath the input surface 104. The display layer 802 may then be beneath the touch sensing layer 804. In these embodiments the strain sensors may be all or mostly transparent so that images produced by the display layer can be viewed through the touch sensing layer 804 and the input surface 104.

Figure 9A:
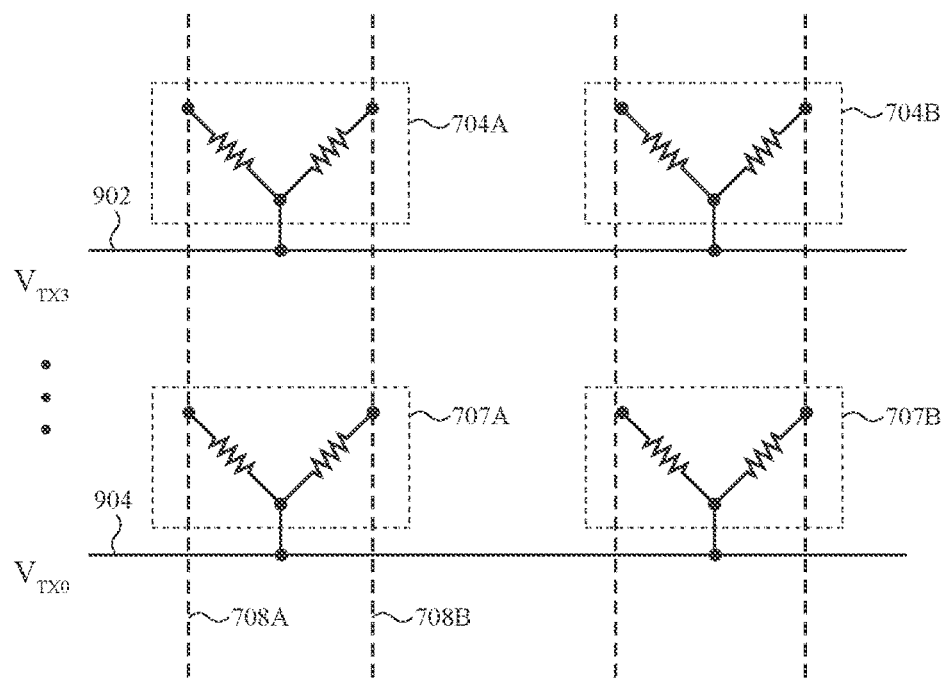
FIG. 9A is a top view of electrical connections for an array of strain sensors, according to an embodiment.
Figure 9B:
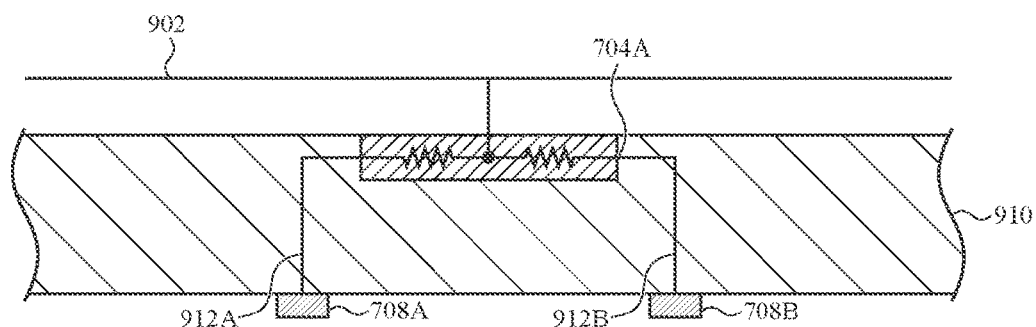
FIG. 9B is a cross-sectional view of electrical connections to a strain sensor, according to an embodiment.

FIGS. 9A-B show embodiments of how electrical connections for an array of strain sensors, such as array 710, can be configured. FIG. 9A shows a top view of two parallel planes used for the electrical connections: a nearer plane containing the electrical connections carrying source signals $V_{TX3}$ on electrical connection 902 and $V_{TX0}$ on electrical connection 904. A second lower plane contains electrical connections 708A and 708B, which may be the current junctions described in connection with FIG. 7. Any or all of the electrical connections 902, 904, 708A-B may be implemented as traces on a substrate layer.

In the embodiment shown in FIG. 9A, the resistance-based strain sensors 704A-B and 707A-B are located on or attached to the nearer plane. The strain-sensitive elements of these strain sensors then pass through to the lower plane to join with the electrical connections on the lower plane. Such a configuration may allow for ease of manufacture by reducing circuit routing complexity.

FIG. 9B shows a cross-sectional view of the routing configuration just described. There is a substrate layer 910, which may be the touch sensing layer 804 described above, that includes the strain sensor 704A. The top surface of substrate layer 910 defines the nearer plane just described. The electrical connection 902 is shown above top surface of substrate layer 910 for visibility, but may be a trace deposited on the surface of substrate layer 910, or may be included in substrate layer above substrate layer 910.

The lower plane may be the bottom surface of substrate layer 910. On the lower plane are the electrical connections 708A and 708B seen in cross-section. Vias 912A-B provide electrical connection from the nearer plane to the lower plane.

In an alternate embodiment, strain sensor 704A may be positioned on the lower plane, i.e., the bottom surface of substrate layer 910, so that its output leads to electrical connections 708A and 708B would be substantially coplanar with them, and that a single via would join electrical connection 902 with the input electrode of strain sensor 704A.

Figure 10A:
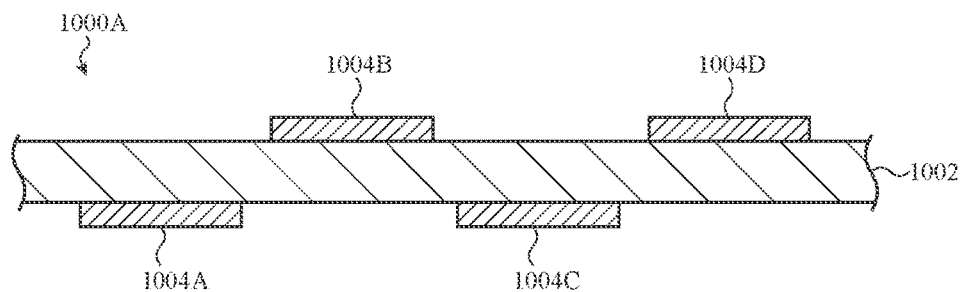
FIGS. 10A-B show cross-sectional views of layouts of strain sensors, according to two embodiments.
Figure 10B:
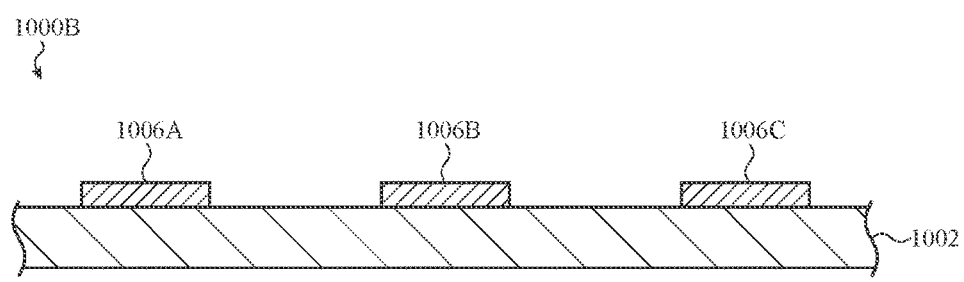

FIGS. 10A-B illustrate two configurations 1000A-B for placing strain sensors on a substrate layer 1002. FIG. 10A illustrates an embodiment 1000A in which strain sensors 1004A-D can placed in or just under the top surface of substrate layer 1002 and additionally on or just within the bottom surface of substrate layer 1002.

FIG. 10B illustrates an alternative embodiment 1000B in which strain sensors 1006A-C are places on or just within one side of substrate layer 1002.

Figure 11:
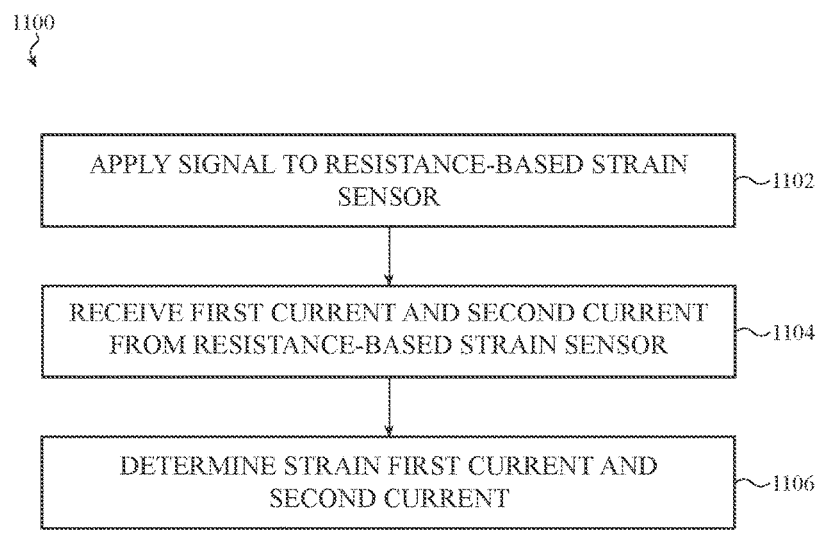
FIG. 11 is a flow chart of a method for determining strain in an electronic device, according to an embodiment.

FIG. 11 is flowchart of a method 1100 for determining strain in a resistance-based strain sensor using current sensing. The method may be used, for example, when the resistance-based strain sensor configured as shown in FIG. 4.

At stage 1102 an input signal is applied to the resistance-based strain sensor. The input signal may be a voltage or current signal. The input signal may be pulsed DC, or have another time dependence.

At stage 1104, a first current and a second current are received from the resistance-based strain sensor, such as in current sensing circuitry. By configuring the resistance-based strain sensor to produce two currents, such as from two strain-sensitive elements, the method is using the resistance-based strain sensor in a current sensing mode.

At stage 1106, the strain is determined from the first and second currents, such as by a ratio of a difference of the currents and a sum of the currents. The determination can be made by separate processing circuitry.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A resistance-based sensing structure operable to determine a physical parameter, comprising:
    a resistance-based parameter sensor comprising:
        a first parameter-sensitive element; and
        a second parameter-sensitive element connected in parallel with the first parameter-sensitive element;
    drive circuitry coupled to the resistance-based parameter sensor and operative to apply a source signal to the resistance-based parameter sensor; and
    current sensing circuitry coupled to the resistance-based parameter sensor and operative to concurrently and separately,
        receive and measure a first current from the first parameter-sensitive element; and
        receive and measure a second current from the second parameter-sensitive element;
    wherein the current sensing circuitry is operable to estimate the physical parameter based on the separate measurements of the first current and the second current.

2. The resistance-based sensing structure of claim 1, wherein:
    the physical parameter is a strain;
    the first parameter-sensitive element is a first strain-sensitive element;
    the second parameter-sensitive element is a second strain-sensitive element; and
    the first strain-sensitive element and the second strain-sensitive element each comprise one of a conductive material or a piezoresistive material.

3. The resistance-based sensing structure of claim 2, wherein the first strain-sensitive element is on a first side of the resistance-based strain sensor, and the second strain-sensitive element is on a second side of the resistance-based strain sensor that is opposite to the first side.

4. The resistance-based sensing structure of claim 1, wherein:
    the source signal is applied at an input node connected to the first parameter-sensitive element and the second parameter-sensitive element;
    the first current is received from a first output node connected to a first output electrode of the first parameter-sensitive element; and
    the second current is received from a second output node connected to a second output electrode of the second parameter-sensitive element, the second output electrode of the second parameter-sensitive element being electrically separated from the first output electrode of the first parameter-sensitive element.

5. The resistance-based sensing structure of claim 4, wherein the source signal is a voltage signal.

6. The resistance-based sensing structure of claim 4, further comprising:
    a first current sink connected to the first output node; and
    a second current sink connected to the second output node.

7. The resistance-based sensing structure of claim 6, wherein the current sensing circuitry comprises an amplifier configured to receive the first current and the second current.

8. The resistance-based sensing structure of claim 6, wherein the current sensing circuitry comprises:
    a first amplifier having a first input junction that receives the first current and a first feedback of a first output signal of the first amplifier; and
    a second amplifier having a second input junction that receives the second current and a second feedback of a second output signal of the second amplifier.

9. The resistance-based sensing structure of claim 1 wherein a value of the physical parameter is determined at least in part by a ratio of a difference between the first current and the second current to a sum of the first current and the second current.

10. A method of determining a physical parameter by a resistance-based parameter sensor comprising a first parameter-sensitive element and a second parameter-sensitive element connected in parallel, the method comprising:
    applying a signal to the resistance-based parameter sensor;
    receiving, separately and concurrently,
        a first current from a first output electrode of the first parameter-sensitive element; and
        a second current from a second output electrode of the second parameter-sensitive element;
    separately obtaining measurements of the first current and the second current;
    determining the physical parameter using the measurements of the first current and the second current.

11. The method of claim 10, wherein determining the physical parameter using the measurements of the first current and the second current comprises:
    determining a difference of the measurements of the first current and the second current;
    determining a sum of the measurements of the first current and the second current; and
    determining a ratio of the difference and the sum.

12. The method of claim 10, wherein the signal is a time-varying voltage signal.

13. The method of claim 10, further comprising:
    receiving the first current and the second current in a current sensing circuit, wherein the current sensing circuit comprises a first amplifier and a second amplifier;
    amplifying the first current with the first amplifier; and
    amplifying the second current with the second amplifier.

14. The method of claim 13, further comprising:
    providing a first current sink at the first output electrode of the first parameter-sensitive element and shunting a first offset current from the first current; and providing a second current sink at the second output electrode of the second parameter-sensitive element and shunting a second offset current from the second current.

15. An electronic device comprising:
an input surface;
a first resistance-based strain sensor positioned beneath the input surface, comprising:
  a first signal input electrode;
  a first strain-sensitive element connected to the first signal input electrode; and
  a second strain-sensitive element connected to the first signal input electrode in parallel with the first strain-sensitive element;
a second resistance-based strain sensor positioned beneath the input surface, comprising:
  a second signal input electrode;
  a third strain-sensitive element connected to the second signal input electrode; and
  a fourth strain-sensitive element connected to the second signal input electrode in parallel with the third strain-sensitive element;
a first signal source operative to apply a first signal to the first signal input electrode;
a second signal source operative to apply a second signal to the second signal input electrode;
a first current junction configured to receive a first current from the first strain-sensitive element and a second current from the third strain-sensitive element;
a second current junction configured to receive a third current from the second strain-sensitive element and a fourth current from the fourth strain-sensitive element;
current sensing circuitry coupled to first current junction and the second current junction; and
a processing structure operative to determine a force applied to the input surface using a sum of the first current and the second current and a sum of the third current and the fourth current,
wherein the sum of the first current and the second current is measured separately from the sum of the third current and the fourth current.

16. The electronic device of claim 15, wherein the first signal source and the second signal source respectively apply the first signal and the second signal alternately.

17. The electronic device of claim 15, further comprising:
a third resistance-based strain sensor positioned beneath the input surface and comprising:
  a third signal input electrode;
  a fifth strain-sensitive element connected to the third signal input electrode; and
  a sixth strain-sensitive element connected to the third signal input electrode in parallel with the fifth strain-sensitive element;
a fourth resistance-based strain sensor positioned beneath the input surface and comprising:
  a fourth signal input electrode;
  a seventh strain-sensitive element connected to the fourth signal input electrode; and
  an eighth strain-sensitive element connected to the fourth signal input electrode in parallel with the seventh strain-sensitive element;
a third current junction configured to receive a fifth current from the fifth strain-sensitive element and a sixth current from the seventh strain-sensitive element;
a fourth current junction configured to receive a seventh current from the sixth strain-sensitive element and an eighth current from the eighth strain-sensitive element;
wherein:
the first signal source is operative to apply the first signal to the third signal input electrode;
the second signal source is operative to apply the second signal to the fourth signal input electrode; and
the processing structure is operative to determine the force on the input surface using a sum of the fifth current and the seventh current and a sum of the sixth current and the eighth current.

18. The electronic device of claim 17, wherein:
the first signal source is operative to apply a third signal to the first signal input electrode and to the third signal input electrode;
the second signal source is operative to apply a fourth signal to the second signal input electrode and to the fourth signal input electrode;
the third signal and the fourth signal are applied simultaneously; and
the third signal and the fourth signal have opposite polarity.

19. The electronic device of claim 18, wherein the force on the input surface is determined using a change in value of at least one of the first, third, fifth, or seventh currents.

20. The electronic device of claim 17, wherein the first signal and the second signal are applied simultaneously with the same polarity.

21. The electronic device of claim 20, wherein the processing structure separately determines a first force applied to the input surface at a first location using the first, second, third, and fourth currents, and a second force applied to the input surface at a second location using the fifth, sixth, seventh and eighth currents.

22. The electronic device of claim 15, wherein:
the first signal source and the second signal source are positioned on a first plane beneath the input surface of the electronic device;
the first current junction and the second current junction are positioned on a second plane beneath the input surface, the second plane being parallel to the first plane and the input surface; and
a first conducting via connects the first strain-sensitive element to the first current junction;
a second conducting via connects the second strain-sensitive element to the second current junction;
a third conducting via connects the third strain-sensitive element to the first current junction; and
a fourth conducting via connects the fourth strain-sensitive element to the second current junction.

* * * * *